United States Patent [19]

Moss

[11] Patent Number: 4,738,207
[45] Date of Patent: Apr. 19, 1988

[54] NON-POLLUTING METHOD OF BURNING FUEL FOR HEAT AND $CO_2$

[76] Inventor: Gerald Moss, Sarajac Ave., East Challow, Wantage, England, OX12 9SA

[21] Appl. No.: 598

[22] Filed: Jan. 6, 1987

[30] Foreign Application Priority Data

Jan. 13, 1986 [GB] United Kingdom ............... 8600615

[51] Int. Cl.⁴ ............................................... F23D 1/00
[52] U.S. Cl. ...................................... 110/347; 48/76; 110/229; 110/345; 423/437
[58] Field of Search ................ 48/77, 101, 210, 76; 110/229, 347, 230, 345; 423/437

[56] References Cited

U.S. PATENT DOCUMENTS

| | | | |
|---|---|---|---|
| 3,912,465 | 10/1975 | Kunii et al. | 48/101 |
| 4,490,157 | 12/1984 | Fernandes | 48/77 X |
| 4,597,771 | 7/1986 | Cheng | 48/77 |
| 4,627,367 | 12/1986 | Butt | 110/347 |

Primary Examiner—Edward G. Favors
Attorney, Agent, or Firm—Miller & Gibbons

[57] ABSTRACT

A non-polluting method of, and apparatus for, burning fuel to produce heat and a $CO_2$-rich hot flue gas stream is described. Fuel (e.g., coal, oil, gas, wood, inter alia) is passed into a gasifier bed (12) containing particles of calcium sulfate and, optionally, calcium oxide. Bed 12 is fluidized by product gas containing an oxygen-transfer mediator (or source thereof) such as hydrogen, and fuel is partially oxidized to gas-phase products including CO and $CO_2$ at a temperature above the carbonation temperature of calcium oxide, calcium sulfate being reduced to calcium sulfide. The gas-phase products are passed into the base of a combustion bed (28) containing particles of calcium sulfate in the presence of an oxygen-transfer mediator and CO is oxidized to $CO_2$ at a temperature above the carbonation temperature of calcium oxide. Calcium sulfide-containing particles from the gasifier and combustion beds (12 and 28) are fluidized by an oxidizing gas (e.g. air) in respective oxidation beds (42,45) and CaS is exothermically oxidized to $CaSO_4$ for re-use. Preferably the particles circulate from the gasifier bed (12) to a first oxidation bed (42), then to the combustion bed (28), a second oxidation bed (45) and back to the gasifier bed (12) via underflow weirs connecting the beds. The gas from each bed is at the temperature of the respective bed (e.g. 850° to 1000° C.) and is used for steam raising, preheating air, etc.

22 Claims, 3 Drawing Sheets

NON-POLLUTING METHOD OF BURNING FUEL FOR HEAT AND $CO_2$

The present invention relates to a substantially non-polluting method of combusting a carbon-containing fuel to produce heat and a $CO_2$-rich gas.

$CO_2$ is used for tertiary oil recovery, inert gas blanketing and food freezing, inter alia. It is obtained from underground reservoirs by drilling, as a by-product of chemical manufacture (e.g. in the production of ammonia from natural gas) and by scrubbing flue gas and similar waste gas sources.

The foregoing methods of obtaining $CO_2$ are all relatively expensive. It is an objective of the present invention to provide a less expensive method and apparatus for the production of $CO_2$.

European patent EP No. 61323B and its U.S. counterpart, U.S. Pat. No. 4,431,622, describe and claim a process for making $CO_2$ from fuel comprising the steps of:

(a) passing a fuel to a dense-phase fluidized fuel-conversion bed containing particles comprising reactive $CaSO_4$ and particles comprising reactive $CaO$, the bed being fluidized by passing into the bottom thereof a fluidizing gas which is substantially free of inert diluents but which contains a mediating moiety and/or a source thereof for mediating the transfer of oxygen from $CaSO_4$ to fuel whereby the fuel is partially oxidized to products including CO and $CO_2$ and some $CaSO_4$ is reduced to CaS substantially without the liberation of sulfur moieties, characterized by the following combination of features;

(b) the temperature of the fuel conversion bed being no greater than the maximum temperature at which CaO will react with $CO_2$ to form $CaCO_3$;

(c) causing particles including particles comprising $CaSO_4$, particles comprising CaS and particles comprising $CaCO_3$ to pass to a fluidized decarbonation bed (preferably a dense phase bed) which is fluidized by passing into the bottom thereof at least some of the partially oxidized gas products from the fuel conversion bed, which gas products include a mediating moiety and/or a source thereof for mediating the transfer of oxygen from $CaSO_4$ to CaS, the decarbonation bed being operated at a temperature above the decarbonation temperature of $CaCO_3$ whereby $CaCO_3$ is decomposed to CaO and $CO_2$ thereby increasing the amount of $CO_2$ in the gas passing through the decarbonation bed; and (d) recovering a gas containing $CO_2$ from the top of the decarbonation bed.

The present invention provides a non-polluting method of combusting a carbon-containing fuel to produce heat and a $CO_2$-rich gas comprising the steps of:

(a) passing the fuel into a first conversion bec (CB1) containing particles comprising calcium sulphate at an elevated reaction temperature above the $CO_2$—$CaCO_3$ equilibrium temperature, the bed being fluidized by an upwardly-passing gas containing an oxygen-transfer mediator which mediates the transfer of oxygen from calcium sulfate to the fuel so that at least some of the fuel is converted to at least partially oxidized gas-phase products at substantially the elevated temperature of the bed and calcium sulphate is reduced to calcium sulphide with substantially no liberation of sulphur moieties; and (b) circulating at least some of the said gas-phase products to the base of a second fluidized conversion bed (CB2) containing particles comprising calcium sulfate at an elevated reaction temperature above the $CO_2$—$CaCO_3$ equilibrium temperature, said gas phase products passing upwardly through said second conversion bed and fluidizing particles therein in the presence of an oxygen-transfer mediator so that carbon monoxide is converted to $CO_2$ at substantially the elevated reaction temperature of the second bed and calcium sulfate is reduced to calcium sulfide with substantially no liberation of sulfur moieties.

Preferably, the said gas-phase products from the first conversion bed contain oxygen-transfer mediator, and a portion of said products is circulated to the base of the first conversion bed and constitutes at least part of the upwardly-passing gas which fluidizes the first bed.

The upwardly-passing gas which fluidizes the first conversion bed may contain water vapour.

Preferably, the upwardly-passing gas which fluidizes the second conversion bed contains water vapour.

Preferably, CaS-containing particles are circulated from the first bed to an oxidizing bed (OB1) wherein they are fluidized by an oxygen-containing gas and CaS is thereby converted to $CASO_4$ at an elevated temperature, particles containing $CaSO_4$ being returned directly and/or indirectly to the first bed.

Preferably, the amount of oxygen in the oxygen-containing gas is in excess of that required for conversion of CaS to $CaSO_4$ whereby conversion of CaS to CaO with liberation of sulfur moieties is substantially suppressed.

Preferably, at least some of the $CaSO_4$-containing particles from the oxidising bed are circulated to the second bed for use in converting CO to $CO_2$.

Preferably, heat is recovered from oxygen-depleted gas leaving the oxidizing bed.

Preferably, CaS-containing particles are circulated from the second conversion bed (CB2) to an oxidizing bed (OB2) wherein they are fluidized by an oxygen-containing gas and a CaS is thereby converted to $CaSO_4$ at an elevated temperature, particles containing $CaSO_4$ being returned directly and/or indirectly to the second bed. Preferably, the amount of oxygen in the oxygen-containing gas is in excess of that required for conversion of CaS to $CaSO_4$ whereby conversion of CaS to CaO with liberation of sulfur moieties is substantially suppressed.

Preferably at least some of the $CaSO_4$-containing particles from the oxidizing bed are circulated to the second conversion bed for use in converting fuel to at least partially-oxidized gas-phase products. Preferably, heat is recovered from oxygen-depleted gas leaving the oxidizing bed (OB2).

Preferably, particles are circulated substantially continuously or intermittently in a circuit comprising, in series, the first conversion bed (CB1), the first-mentioned oxidizing bed (OB1), the second conversion bed (CB2), the second-mentioned oxidizing bed (OB2), and the first conversion bed (CB1).

Preferably, particles are added to at least one of the beds to maintain the chemical activity of the particles therein.

Preferably, particles are added to at least one of the beds to maintain the chemical activity of the particles therein. Preferably, said particles comprise calcium carbonate.

Preferably, a portion of the particles in the beds is discarded to maintain the amount of particles therein.

Preferably, the particles comprising CaO or a mixed compound comprising CaO to fix sulfur from the fuel as a solid compound comprising calcium and sulfur.

Preferably, the method of the invention comprises circulating a portion of the particles to a regenerating bed wherein the particles are contacted with a regenerating gas to convert the said solid compound comprising calcium and sulfur to calcium oxide with the liberation of sulfur as sulfur moieties and returning at least some of some regenerated particles to at least one of the beds.

Preferably, the method of the invention comprises passing the gas-phase products from the first conversion bed in indirect heat-exchange relationship with a heat-recovery fluid.

The invention also includes a $CO_2$-rich gas produced by the method as herein described.

In another aspect, the invention provides apparatus for combusting a carbon-containing fuel to produce heat and a $CO_2$-rich gas comprising means defining a first conversion bed space for containing a first conversion bed (CB1), means defining a second conversion bed space for containing a second conversion bed (CB2), means for passing carbon-containing fuel into said first conversion bed space, meant for circulating at least partially oxidized gas-phase products from an upper region of the first conversion bed space to lower region of the first and second conversion bed spaces to serve as at least part of an upwardly-passing gas in said bed spaces for fluidizing particles therein, means for regulating the relative proportions of said gas-phase products passing to each of the conversion bed spaces, and means for recovering a $CO_2$-rich gas from an upper region of the second conversion bed space.

Preferably, the apparatus comprises means defining an oxidizing bed space (OB1) for containing a bed of particles, one zone of said oxidizing bed space being connected to one zone of the first conversion bed space for receiving particles therefrom, and another zone of the oxidising bed space being connected to one zone of the second conversion bed space for the passage of particles thereto, and means operable to pass an oxygen-containing gas through the oxidizing bed space to oxidize oxygen-depleted particles therein.

The apparatus may comprise means defining a second oxidizing bed space (OB2) for containing a bed of particles, one zone of said second oxidizing bed space being connected to one zone of the second conversion bed space for receiving particles therefrom, and another zone of the oxidizing bed space being connected to one zone of the first conversion bed space for the passage of particles thereto, and means operable to pass an oxygen-containing gas through the second oxidizing bed space to oxidize oxygen-depleted particles therein.

Preferably, the means defining each bed space define underflow weirs for the passage of particles from a lower region of one bed space and into a lower region of another bed space.

Preferably, a char dam is provided in the first oxidizing bed space which extends downward into the first conversion bed to a level below the surface level thereof at a position upstream of the respective underflow weir but adjacent to the means defining said underflow weir so as to prevent char passing from the first conversion bed to the first oxidizing bed.

Preferably, the underflow weirs are formed in wall means which, on one face, define part of the side of an oxidizing bed space, and on the other face, define part of the side of a conversion bed space.

Preferably, the wall means are cast in situ.

The invention will now be further described with reference to a non-limitative embodiment thereof and with reference to the accompanying diagrammatic and highly schematic drawings, in which FIG. 1 shows, schematically, the principal features of the gas circulation in a plant for the substantially non-polluting combustion of fuel to produce heat and a $CO_2$-rich gas;

Figure 1:
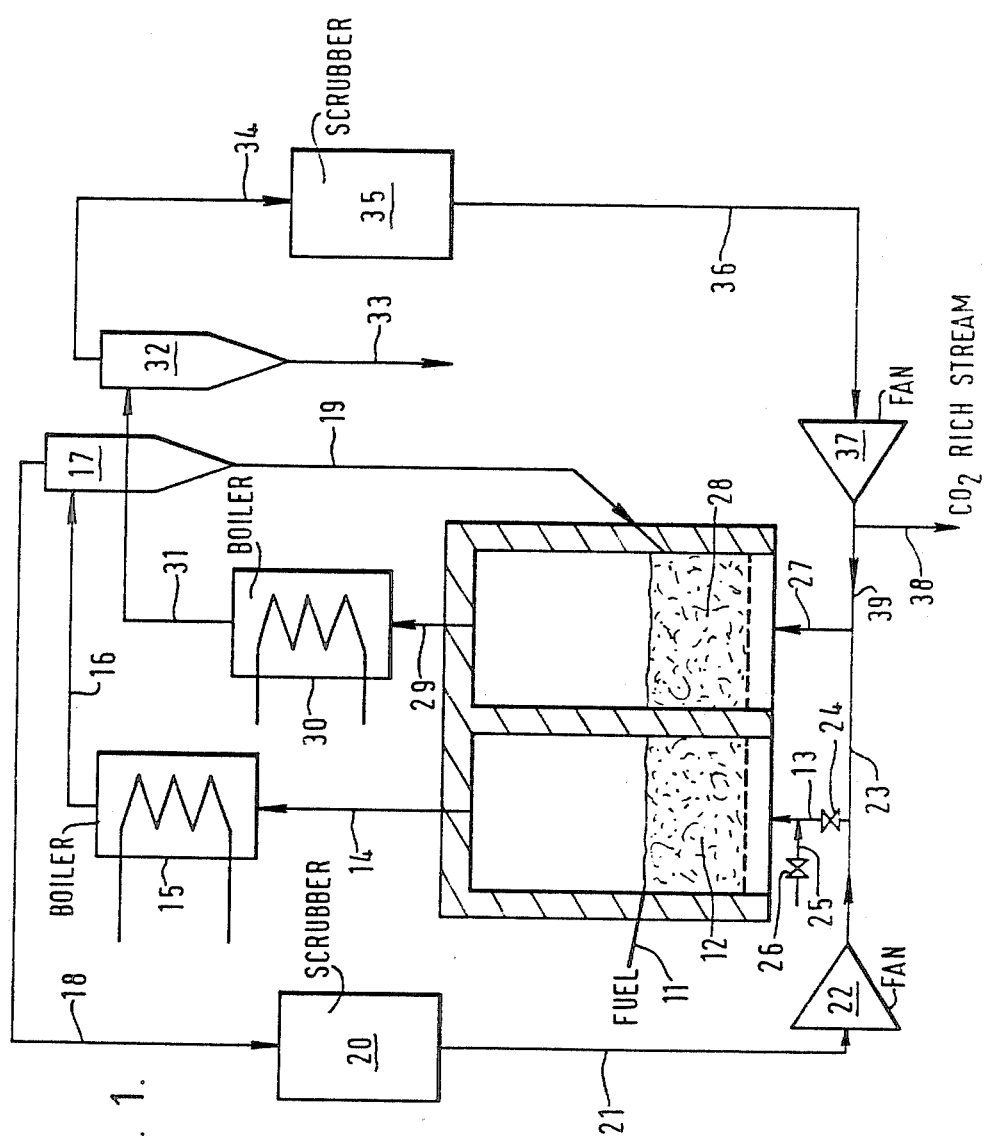

Reference is first made to FIG. 1. Particles of coal or other carbon-containing fuel (which may be a solid fuel such as lignite, coal, shale, wood, or a liquid or gaseous fuel) is passed via line 11 into a partial oxidation fluidized conversion bed 12 of particles containing calcium sulfate and calcium oxide. The bed 12 is fluidized by the passage therethrough of an upwardly-passing gas containing at least one oxygen-transfer mediator, such as hydrogen and/or $CO_2$ and/or $H_2O$, supplied from line 13.

The bed 12 is at a temperature above that at which the reaction $CaO + CO_2 \rightarrow CaCO_3$ will take place at the operating pressure. Preferably the operating pressure is substantially atmospheric pressure, and the temperature of bed 12 is in the range of from about 850° to 1000° C., preferably 900° to 970° C., e.g. about 950° C. At these temperatures, and in the presence of an oxygen-transfer mediator such as hydrogen, the carbon and other fuel values of the coal are partially or fully oxidized by the oxygen from calcium sulfate, the latter being reduced to calcium sulfide. Preferably, the fuel is supplied to bed 12 in excess of the requirements for complete combustion, and the following reaction between carbon and calcium sulfate takes place:

$$CaSO_4 + 4C \rightarrow CaS + 4CO$$

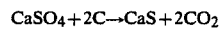

$$CaSO_4 + 2C \rightarrow CaS + 2CO_2$$

Sulfur in the fuel reacts with calcium oxide in the bed particles to form calcium sulfide according to the reaction scheme:

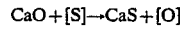

$$CaO + [S] \rightarrow CaS + [O]$$

The reducing nature of the fluidizing gas substantially suppresses the liberation of sulfur moieties (e.g. as $SO_2$) from the calcium sulfate and sulfide.

The gas leaving the top of the bed 12 is substantially at the temperature of the bed 12 and contains CO, $CO_2$, $H_2$, $H_2O$ and small quantities of hydrocarbons. It is substantially free of sulfur and has a low content of nitrogen and nitrogen oxides.

The gas is recovered in line 14 and passed to a boiler 15 where its heat is utilized for steam-raising. The resulting cooled gas passes via line 16 to de-dusting equipment including, e.g. a cyclone separator 17, and the de-dusted gas is recovered in line 18, solids from the de-dusting equipment being recovered in line 19. The de-dusted gas is preferably scrubbed in a wet-scrubber 20 to reduce its solids content to a level which is acceptable by a circulation fan, and the scrubbed gas passes via line 21 to such a fan 22 which circulates the gas into line 23. Some of the gas in line 23 is passed via line 13 into the conversion bed 12 and serves as the fluidizing gas therefor. The amount of gas passed into the bed 12 is fixed by the setting of a control valve 24. If it is desired to augment the hydrogen content of the gas in the bed 12, a small proportion of steam may be added thereto via line 25 at a rate regulated by valve 26. The steam reacts with carbon in the bed according to the equation: $C+H_2O \rightarrow CO+H_2$. A relatively small proportion of hydrogen or source thereof, e.g. steam, in the gas in bed 12 is required to serve as the oxygen-transfer mediator to mediate the transfer of oxygen from $CaSO_4$ to the fuel.

The remaining gas in line 23 is passed via line 27 into the bottom of a combustor bed 28. The combustor bed contains particles comprising calcium sulfate and calcium oxide, and the particles are fluidized by the gas from line 27. If desirable or necessary, a small supplement of steam may be added to the gas in line 27 to augment the hydrogen content of the gas which fluidizes bed 28.

The temperature of bed 28 is similar to that of bed 12, e.g. in the range of about 850° to 1000° C., e.g. about 950° C., if operating at atmospheric pressure, and carbon monoxide is oxidised therein to carbon dioxide by the mediated oxygen transfer from calcium sulfate, according to the equation; $CaSO_4+4CO \rightarrow CaS+4CO_2$. Other oxidizable moieties in the gas, such as hydrogen and hydrocarbons, are similarly oxidized to carbon dioxide and steam. The resulting gas leaving the top of bed 28 is substantially at the temperature of bed 28 and comprises predominantly carbon dioxide with minor quantities of CO, steam, and no more than very small proportions of contaminants such as nitrogen, nitrogen oxides and sulfur moieties.

The product gas from bed 28 is recoverd in line 29 and passed through boiler 30 to utilize its heat content by raising steam. The product gas at a lower temperature is passed via line 31 to de-dusting equipment including cyclone separator 32. Solids are recovered in line 33, and separated gas in line 34. The recovered solids are preferably dumped after suitable treatment to prevent sulfurous emissions therefrom. The solids in line 19 may also be dumped in the same way, but since it is likely that they will usually contain carbon, it is preferred to circulate the solids into one or both of beds 12 and 28 so that the carbon in the solids can be converted to carbon dioxide. As depicted, the solids in line 19 are circulated to bed 28 to this end.

The separated gas in line 34 is de-dusted, e.g. preferably scrubbed, in wet scrubber 35 to reduce its temperature and solids content to levels which are acceptable to a circulating fan, and the scrubbed gas is passed via line 36 to a circulating fan 37. Most or all of the gas is recovered via product line 38, but some gas may be passed via line 39 for recirculation to the bed 28 to regulate the temperature therein for maximum CO conversion.

Figure 2:
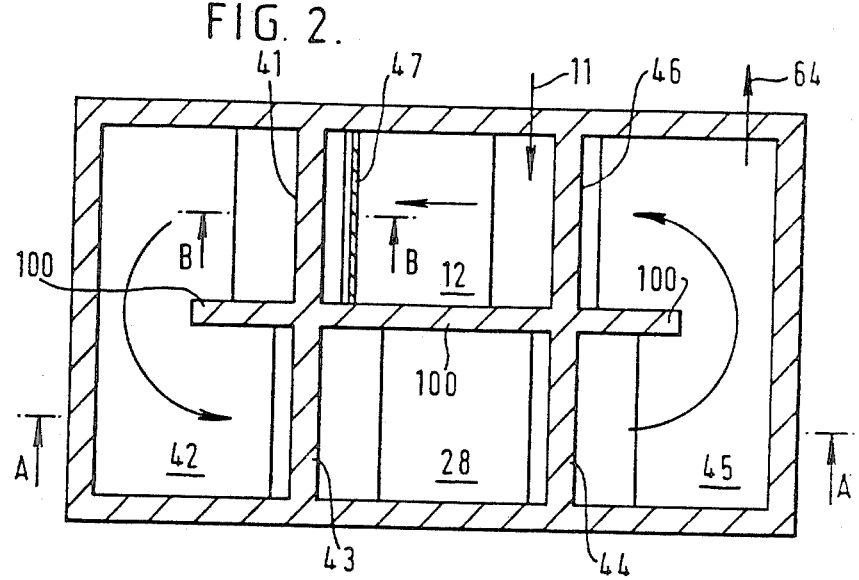
FIG. 2 is a schematic plan view of the principal features of the fluidized beds in the plant of FIG. 1.
Figure 2A:
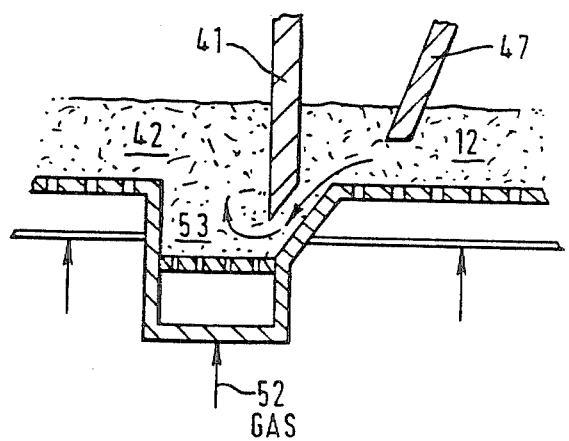
FIG. 2A is an elevation in the plane of line B—B of FIG. 2.
Figure 3:
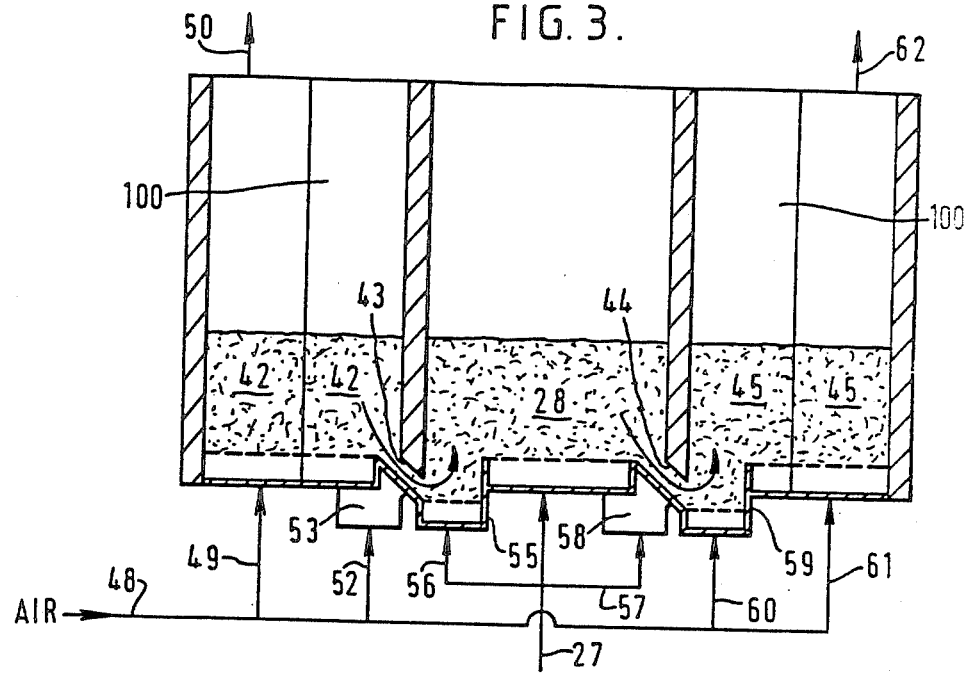
FIG. 3 is a diagrammatic vertical cross-sectional elevation in the plane of line A—A of FIG. 2.

Reference is now made to FIGS. 2, 2A and 3. It will be seen from FIG. 2 that the particles circulate in clockwise sense around a longitudinal septum wall 100 from the conversion bed 12 via an underflow weir 41 into a first oxidiser bed 42, and thencefrom via an underflow weir 43 into the second conversion bed 28, and thencefrom via an underflow weir 44 into a second oxidiser bed 45, and thencefrom via an underflow weir 46 into the conversion bed 12. A char dam 47 extends across the bed 12 and extends about 15 to 20 cms below the surface thereof to help prevent char and similar carbonaceous material which concentrates in the region of the bed surface from passing into the region of underflow weir 41 thereby reducing or substantially eliminating losses of fuel values with particles passing to the bed 42. The upstream-facing surface of the dam 47 is inclined away from the upstream wall of bed 12 to cause char particles to become defluidized in the vicinity of the said surface of the dam 47.

The particles entering the first oxidizer bed 42 comprise calcium sulfate, calcium sulfide and calcium oxide and are preferably substantially free of char and other fuel values. The particles in the bed 42 are fluidized by an oxygen-containing gas, which conveniently is air. FIG. 3 shows air being supplied via line 48 to the plant. Line 49 conducts air into the bed 42 where it serves to oxidize calcium sulfide to calcium sulfate according to the equation.

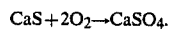

$$CaS+2O_2 \rightarrow CaSO_4.$$

The air in line 49 is regulated by valves (not shown) to be in a slight excess relative to the calcium sulfide so that a minor proportion (e.g. 0.5 to 1.0%) of oxygen is present in the gas leaving the bed 42. The excess oxygen suppresses the release of sulfur moieties, e.g. as $SO_2$. The oxidation of calcium sulfide to calcium sulfate is highly exothermic, and the temperature of the bed 42 is maintained in the range of about 900° to 1050° C., e.g. about 1000° C. The gas leaving the first oxidizer bed 42 via line 50 is oxygen-depleted air containing 0.5 to 1.0% oxygen, and may be employed for many of the uses for which pure nitrogen is used. The oxygen-depleted air is at the temperature of the first oxidizer bed 42 and may be used to preheat the air in line 48 and also for steam-raising and heating boiler feed water.

The temperature of bed 42 may be controlled by recycling cooled off-gas therefrom and/or by passing additional air therethrough.

Particles containing calcium sulfate pass via the underflow weir 43 into the second conversion bed 28 where they are fluidized by gas from the first conversion bed 12 which enters the bed from line 27. As will be seen from FIG. 3, the underflow weir 43 is in the form of a downwardly-inclined chute whose underside protrudes into the bed 42 thereby ensuring that defluidization occurs above the protruding underside. The defluidized particles which accumulate thereon slide down the underflow weir 43, and are received in a well 55 beneath the upstream part of bed 28 and from which they are upwardly fluidized into the bed 28 by gas from bed 12, supplied via lines 27 and 56.

The reactions in bed 28 have already been described with reference to FIG. 1. Particles containing calcium sulfide pass from bed 28 to a second oxidizer bed 45 by an underflow weir arrangement similar to that described in relation to the underflow weir 43. The inclined underside of the underflow weir 44 protrudes into the bed 28 and causes defluidization of particles which then slump onto the said underside. The slumped particles slide down the underside of the weir, and are fluidized into bed 45 by air from line 60.

The particles from underflow weir 44 are received in a well 59 from where they are upwardly fluidized into the second oxidizer bed 45 by air supplied from lines 48 and 60.

The second oxidizer bed 45 is fluidized by air in a slight excess relative to the calcium sulfide therein in order to oxidize calcium sulfide to calcium sulfate while substantially suppressing the liberation of sulfur moieties therefrom (e.g. as $SO_2$). The fluidizing air is supplied to bed 45 from lines 48 and 61, and the reaction which takes place is: $CaS + 2O_2 \rightarrow CaSO_4$. The heat liberated by the reaction maintains bed 45 at a temperature in the range 900° to 1050° C. (for operation at atmospheric pressure or thereabouts), preferably about 1000° C.

The waste gas leaving bed 45 via line 62 is oxygen-depleted air at about the temperature of bed 45. It may be used as described with reference to the gas in line 50.

Particles are circulated from the second oxidizer bed 45 to the first conversion bed 12 via the underflow weir 46 for use in converting further quantities of fuel.

The construction and operation of underflow weir 46 and its associated well 58 are similar to that of underflow weir 43, and the construction and operation of the underflow weir 41 and its associated well 53 are similar to that of underflow weir 44. Solids which pass via weir 46 into well 58 are upwardly fluidized therefrom into bed 12 by gas from lines 27 and 57, and solids which pass via weir 41 into well 53 are upwardly fluidized into bed 42 by air from lines 48 and 52.

In order to maintain the chemical composition and activity of the circulating particles, fresh particles (e.g. of limestone or dolomite) are added to the first conversion bed 12. The fresh particles liberate $CO_2$ and are available to capture sulfur from the fuel to form CaS which will subsequently be oxidized to $CaSO_4$ in the oxygen bed(s). The inventory of circulating particles is maintained approximately constant by removing particles via a purge line 64 from oxidizing bed 45. The purged particles may be dumped and/or they can be regenerated, at least in part, by fluidization by air in a regeneration bed (not shown) into which a slight excess of fuel is injected. Sulfur moieties (e.g. $SO_2$ and/or S) are liberated and the regenerated CaO-containing particles may be returned to the plant (e.g. to gasifier 12).

The plant can be operated in heat balance provided the gas flows to the respective beds are correctly adjusted. About 50% of the heat energy is released from the oxidizing beds 42, 45 in the flue gas, and the recirculating gas in the conversion beds 12 and 28 carries the balance of the heat energy. Since excess air to the oxidizing beds 42 and 45 and gas recirculating to the conversion beds 12 and 28 are controllable, no heat transfer surfaces are required within any of the beds.

The invention is not restricted to the embodiment in the form herein described.

Figure 4:
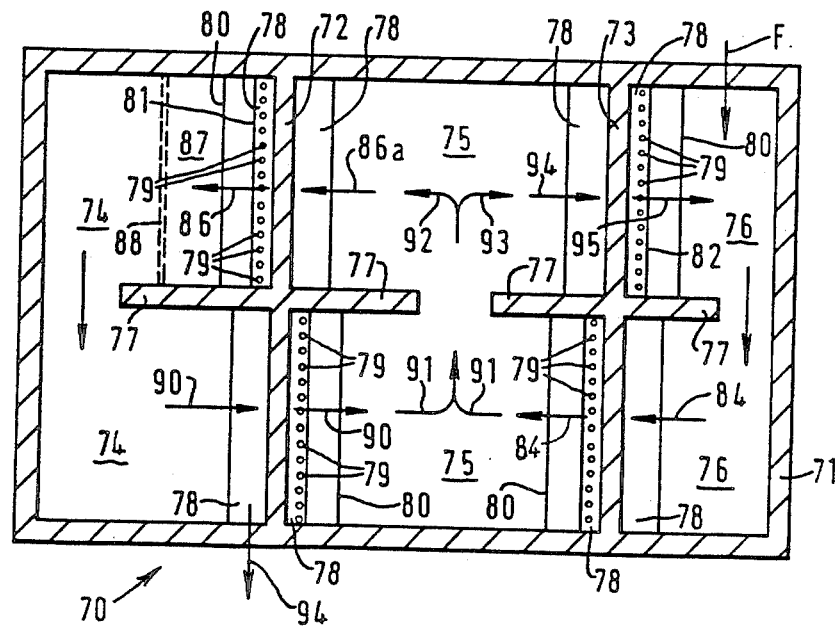
FIG. 4 is a schematic plan view of the principal features of another embodiment of a plant according to the invention.

Reference is now made to the embodiment shown in diagrammatic and schematic plan view in FIG. 4 wherein the principal features necessary for an understanding thereof are depicted and ancillary items, such as fans, heat exchangers, valves and like means, whose presence would be appreciated by the skilled technologist, have been omitted in the interests of clarity and simplicity of explanation.

The apparatus 70 of the FIG. 4 embodiment comprises an outer wall 71 defining an interior space. Two substantially parallel spaced-apart walls 72,73 respectively extend across the interior space thereby dividing it into three compartments 74,75,76 respectively. Each compartment is partially divided by a respective wall portion 77 which extends thereinto from the walls 72,73. The adjoining parts of adjacent compartments communicate with each other via underflow weirs (not shown) at the base of each wall 72,73. The form of the underflow weirs is substantially the same as the underflow weirs 43 described with reference to FIGS. 2 and 3, and comprises a slot-like port which is downwardly-inclined in the direction of intended flow of particles between fluidized beds thereof in the compartments, as indicated by the arrows. Preferably, in this and other embodiments the downward inclination is greater than the angle of repose of particles circulating in the apparatus. The bottom of each compartment is constructed to serve as a distributor to distribute fluidizing gas into the bottom of the respective bed (not shown) of particles, to fluidize the latter, but in the vicinity of each port, there is an inclined floor member 78 which forms and/or merges with the bottom part of each port and which has no means to distribute fluidizing gas into the bed other than control orifices 79 at its lower end. The fluidized particles in each bed become defluidized when passing over a floor member 78, and slump thereonto. The downward inclination of each floor member 78 promotes sliding movement of particles thereon downwardly and through the corresponding port into the adjoining part of the adjacent bed compartment. The rate at which particles pass through each port is regulated by the rate at which control gas (e.g. steam) is passed through the control orifices 79. The control gas fluidizes solids which might otherwise pack at the exit from each port and causes them to pass upwardly into the fluidized bed above the gas-distributor part of the compartment's bottom. It will be understood that for each floor member 78, the bottom of a compartment will have an upward "step", e.g. as indicated by lines 80 in compartment 76. The arrangement is similar to that described with reference to, and shown in, FIG. 3.

The compartment 76 contains a fluidized bed (not shown) of particles comprising $CaSO_4$ and CaO at an average temperature similar to bed 12 of FIGS. 1 to 3 (e.g. about 950° C.). Fuel is passed into the bed as indicated by arrow F where, in the presence of an oxygen-transfer mediator, such as hydrogen (or a source thereof such as steam), in the upwardly-passing fluidizing gas, the carbon and other fuel values are partially or fully oxidized by oxygen transferred from the $CaSO_4$, the latter being reduced to CaS. Sulfur in the fuel reacts with CaO to form calcium sulfide, and the reducing atmosphere in the bed substantially suppresses the liberation of sulfur moieties (e.g., as $H_2S$, sulfur or $SO_2$). The gas leaving the top of the bed in compartment 76 is substantially at the bed temperature and contains CO, $CO_2$, $H_2$, $H_2O$, small quantities of hydrocarbons and is virtually free of nitrogen, compounds thereof and sulfur moieties. The gas may be scrubbed and/or otherwise cleaned so that it will not form deposits in pipes and in the distributor-bottom of compartment 75 (inter alia), and is then passed into the bed (not shown) of particles in compartment 75, to fluidize said particles.

During the (partial) oxidation of fuel in compartment 76, carbonaceous material becomes associated with the particles therein, and the particles pass via the underflow weir in wall 78 into the compartment 75 as indicated by arrows 84. The compartment 75 comprises a bed of particles containing, inter alia, $CaSO_4$, fluidized by gas from the compartment 76, which may be supplemented if necessary or desirable, by steam to provide an adequate fluidizing gas velocity and/or a source of hydrogen to serve as oxygen-transfer mediator. The average bed temperature is similar to that of bed 28 of FIGS. 1 to 3 (e.g. about 900° C.) and in the presence of the oxygen-transfer mediator, carbon monoxide and hydrocarbons in the fluidizing gas from the compartment 76 are oxidized to carbon dioxide and steam by oxygen transferred from calcium sulfate, which is thereby reduced to calcium sulfide, the liberation of sulfur moieties being substantially suppressed by the reducing atmosphere and the presence of calcium oxide. In addition to the foregoing reactions, carbonaaceous material associated with particles from compartment 76 is oxidized to carbon dioxide (inter alia) by the mediated transfer of oxygen from $CaSO_4$, which is thereby reduced to CaS.

The gas leaving the bed in compartment 76 contains $CO_2$ with minor quantities of CO, and no more than small proportions of nitrogen, nitrogen oxides and sulfur moieties.

Particles circulate from the bed in compartment 75 to a fluidized bed (not shown) in compartment 74 by passage through the port (not indicated) at the base of wall 72 as indicated by the arrows 86 and at a rate determined by the control gas rate (e.g., air rate) via the control orifices 79 in the floor member 78. The particles entering the compartment 74 contain CaS and are preferably substantially free of carbon. In compartment 74, the particles are fluidized in a bed by air (or other oxygen-containing gas), which may have been pre-heated by heat-exchange with one or both gas streams leaving the other compartment(s) 75 and/or 76. The air rate is preferably sufficient to provide a small excess (e.g., up to 5.0%, preferably 0.5 to 2.0%, more preferably about 1%) of oxygen in the gas leaving compartment 74 in order to suppress the liberation of sulfur moieties (e.g. $SO_2$). The bed is operated at an average temperature similar to the bed 45 of FIGS. 1 to 3 (e.g. about 1000° C.) and CaS is exothermically oxidized to $CaSO_4$. In this and other embodiments, sulfur may be purged from the circulating solids, when its concentration (e.g. as CaS) becomes excessive, by providing a reduced oxygen to CaS ratio (e.g. locally in a part 87 of compartment 74, for example in the region between the optional wall 88 shown in broken lines and the immediately upstream wall 72) so that some CaS is exothermically oxidized to CaO with the liberation of $SO_2$. This type of sulfur purge arrangement may also be employed in other embodiments, e.g. that of FIGS. 1 to 3. It is important to ensure that when such a sulfur purge arrangement is used, the rate of sulfur liberation from bed part 87 is not substantially greater than the rate at which sulfur from the fuel is fixed in particles in compartment 76 as calcium sulfide by reaction with calcium oxide so that the hot particles passing through the remainder of compartment 74 will contain sufficient chemically-active calcium sulfate (resulting from the oxidation of calcium sulfide) to provide the oxygen necessary for the mediated oxidation reactions in compartments 75 and 76. In this and other embodiments, the sulfur purge may be operated intermittently by varying the air flow rate to part 87 of the compartment or continuously by maintaining a steady air flow rate thereto.

The hot particles containing chemically-active calcium sulfate pass from compartment 74 to compartment 75 via the underflow weir arrangement in dividing wall 72, in the manner described in relation to the other underflow weir arrangements, as indicated by arrows 90, at a rate determined by the rate of passage of control gas (such as steam) through the control orifices 79 in the floor member 78.

In the compartment 75, e.g. mainly on one side of the dividing wall portion 77, the hot $CaSO_4$-containing particles from compartment 74 mix with cooler particles and associated carbonaceous material from compartment 76, as indicated schematically by arrows 91. In the presence of the oxygen-transfer mediator (e.g. hydrogen) and/or the source thereof (e.g. steam) in the gas which fluidizes particles in compartment 75, the carbonaceous material is oxidized to carbon dioxide (and also to carbon monoxide) by oxygen transferred from calcium sulfate, the latter being reduced to calcium sulfide. The liberation of sulfur moieties (e.g. hydrogen sulfide, elemental sulfur) is substantially suppressed by the oxygen-transfer mediator. Thus carbon materials which are transferred to compartment 75 from compartment 76 are at least partly oxidized to carbon dioxide which augments the amount of carbon dioxide in the gas leaving the bed in compartment 75. On the other side of the dividing wall portion 77, some particles in compartment 75 circulate towards compartment 74 as indicated by arrow 92 and some particles circulate towards compartment 76 as indicated by arrow 93, and pass thereinto as indicated by arrows 94,95.

Preferably, the arrangement and operation of the FIG. 4 embodiment are such that by the time particles in compartment 75 have circulated to the vicinity of the wall 72 defining the division between compartments 75 and 74 (e.g. the vicinity of arrow 86a), the particles should be substantially free of associated carbonaceous material so that all the fuel material will have been converted to carbon dioxide and other conversion products in the beds in compartments 76 and 75, and no oxidation of carbon to carbon oxides will occur in the bed in compartment 74. However, it is recognized that it may not always be possible to ensure this. Similarly, it is preferred that the arrangement and operation are such that particles passing from compartment 75 to the bed in compartment 76 should be substantially free of associated carbonaceous material as a result of the oxidation thereof in compartment 75 to avoid a buildup of carbonaceous material associated with the particles in compartments 76 and 75. It is recognized that this may not always be achieved. However, the skilled technologist will appreciate which factors of design and operation of the equipment will lead to the greatest conversion of carbonaceous material to carbon dioxide.

The particles passing from the bed in compartment 75 to the bed in compartment 74 will be at the bed temperature of the former and comprise chemically-active calcium sulfide (and there may also be some non-reduced chemically-active calcium sulfate). The particles passing from the bed in compartment 75 to the bed in compartment 76 will be at the bed temperature of the former and will comprise non reduced chemically-active calcium sulfate (and there may also be some chemically-active calcium sulfide). The skilled technologist will appreciate which factors of design and operation of the equipment will cause the particles entering compartment 74 to have a relatively high content of calcium sulfide and a relatively low content of calcium sulfate, and will also appreciate which factors will cause the particles entering compartment 76 to have a relatively high content of calcium sulfate and a relatively low contaent of calcium sulfide. The symmetrical plan view of the apparatus as depicted for illustrative purposes in FIG. 4 may not be the most appropriate to secure the desirable chemical compositions (with respect to sulfide, sulfate and carbonaceous materials) of particles passing from the bed in compartment 75 to the beds in compartments 74 and 76. The particles-entering compartment 76 provide not only chemically-active calcium sulfate for the mediated oxidation of fuel injected thereinto from line F but also sensible heat to assist in the maintenance of the average temperature in compartment 76 at about 900° C. The particles entering compartment 75 from compartment 74 provide chemically-active calcium sulfate for the mediated oxidation of gaseous and solid fuel values in the bed in compartments 75 and 74 and also sensible heat to assist in the maintenance of the temperatures of both beds.

The purpose of the wall portions 77 (and the corresponding parts of the septum 100 of FIGS. 2 and 3) is to ensure that the mean residence time of particles in each bed is maintained at the desired value or thereabouts and "short-circuiting" of particles straight from the entrance to a compartment to its exit is substantially prevented.

In order to avoid a buildup of deactivated particles, unburned carbonaceous material and/or ash, particles may be continuously or intermittently purged from the system (e.g. from the downstream end of compartment 74 as indicated by arrow 94). In order to maintain the chemical activity of particles in the system, fresh particles comprising $CaCO_3$ (e.g. as dolomite) and chemically active calcium sulfate may be added to the system (e.g. to compartment 75).

It is to be appreciated that features described in connection with one embodiment may be employed in other embodiments, and factors which apply to one embodiment may be arranged to apply to other embodiments.

I claim:

1. A non-polluting method of combusting a carbon-containing fuel to produce heat and a $CO_2$-rich gas comprising the steps of:
   (a) passing the fuel into a first conversion bed (CB1) containing particles comprising calcium sulfate at an elevated reaction temperature above the $CO_2$—$CaCO_3$ equilibrium temperature, the bed being fluidized by an upwardly-passing gas containing an oxygen-transfer mediator which mediates the transfer of oxygen from calcium sulfate to the fuel so that at least some of the fuel is converted to at least partially oxidised gas-phase products at substantially the elevated temperature of the bed and calcium sulfate is reduced to calcium sulfide with substantially no liberation of sulfur moieties; and
   (b) circulating at least some of the said gas-phase products to the base of a second fluidized conversion bed (CB2) containing particles comprising calcium sulfate at an elevated reaction temperature above the $CO_2$—$CaCO_3$ equilibrium temperature, said gas phase products passing upwardly through said second conversion bed and fluidizing particles therein in the presence of an oxygen-transfer mediator so that carbon monoxide is converted to $CO_2$ at substantially the elevated reaction temperature of the second bed and calcium sulfate is reduced to calcium sulfide with substantially no liberation of sulfur moieties.

2. A method as in claim 1 in which the said gas-phase products from the first conversion bed contain oxygen-transfer mediator, and a portion of said products is circulated to the base of the first conversion bed and constitutes at least part of the upwardly-passing gas which fluidizes the first bed.

3. A method as in claim 1 wherein the upwardly-passing gas which fluidizes the first conversion bed contains water vapour.

4. A method as in claim 1 in which the upwardly-passing gas which fluidizes the second conversion bed contains water vapour.

5. A method as in claim 1 in which CaS-containing particles are circulated from the first bed to an oxidizing bed (OB1) wherein they are fluidized by an oxygen-containing gas and CaS is thereby converted to $CaSO_4$ at an elevated temperature, particles containing $CaSO_4$ being returned directly and/or indirectly to the first bed.

6. A method as in claim 5 in which the amount of oxygen in the oxygen-containing gas is in excess of that required for conversion of CaS to $CaSO_4$ whereby conversion of CaS to CaO with liberation of sulfur moieties is substantially suppressed.

7. A method as in claim 5 in which at least some of the $CaSO_4$-containing particles from the oxidizing bed are circulated to the second bed for use in converting CO to $CO_2$.

8. A method as in claim 5 in which heat is recovered from oxygen-depleted gas leaving the oxidizing bed.

9. A method as in claim 1 in which CaS-containing particles are circulated from the second conversion bed (CB2) to an oxidizing bed (OB2) wherein they are fluidized by an oxygen-containing gas and CaS is thereby converted to $CaSO_4$ at an elevated temperature, particles containing $CaSO_4$ being returned directly and/or indirectly to the second bed.

10. A method as in claim 9 in which the amount of oxygen in the oxygen-containing gas is in excess of that required for conversion of CaS to $CaSO_4$ whereby conversion of CaS to CaO with liberation of sulfur moieties is substantially suppressed.

11. A method as in claim 9 in which at least some of the $CaSO_4$-containing particles from the oxidizing bed are circulated to the second conversion bed for use in converting fuel to at least partially-oxidized gas-phase products.

12. A method as in claim 9 in which heat is recovered from oxygen-depleted gas leaving the oxidizing bed (OB2).

13. A method as in claim 9 in which particles are circulated substantially continuously or intermittently in a circuit comprising, in series, the first conversion bed (CB1), a first oxidizing bed (OB1) wherein they are fluidized by an oxygen-containing gas and CaS is thereby converted to $CaSO_4$ at an elevated temperature, the second conversion bed (CB2), the said (second) oxidizing bed OB2, and the first conversion bed (CB1).

14. A method as in claim 1 in which particles are added to at least one of the beds to maintain the chemical activity of the particles therein.

15. A method as in claim 14 in which said particles comprise calcium carbonate.

16. A method as in claim 14 in which a portion of the particles in the beds is discarded to maintain the amount of particles therein.

17. A method as in claim 1 in which the particles include particles comprising CaO or a mixed compound comprising CaO to fix sulfur from the fuel as a solid compound comprising calcium and sulfur.

18. A method as in claim 17 comprising circulating a portion of the particles to a regenerating bed wherein the particles are contacted with a regenerating gas to convert the said solid compound comprising calcium and sulfur to calcium oxide with the liberation of sulfur as sulfur moieties and returning at least some of the regenerated particles to at least one of the beds.

19. A method as in claim 1 comprising passing the gas-phase products from the first conversion bed in indirect heat-exchange relationship with a heat-recovery fluid.

20. A method as in claim 1 comprising passing the $CO_2$-rich gas from the second conversion bed in indirect heat exchange relationship with a heat-recovery fluid.

21. A $CO_2$-rich gas produced by the method of claim 1.

22. Apparatus for combusting a carbon-containing fuel to produce heat and a $CO_2$-rich gas comprising means defining a first conversion bed space for containing a first conversion bed (CB1), means defining a second conversion bed space for containing a second conversion bed (CB2), means for passing carbon-containing fuel into said first conversion bed space, means for circulating at least partially oxidized gas-phase products from an upper region of the first conversion bed space to lower region of the first and second conversion bed spaces to serve as at least part of an upwardly-passing gas in said bed spaces for fluidizing particles therein, means for regulating the relative proportions of said gas-phase products passing to each of the conversion bed spaces, and means for recovering a $CO_2$-rich gas from an upper region of the second conversion bed space.

* * * * *